3,046,195
PROCESS FOR DEGLYCYRRHIZINATING LICORICE (SUCCUS LIQUIRITIAE)

Marinus A. Zagt, Jr., Amsterdam, Netherlands, assignor to Gerardus Van Loon, trading as Cedona, Haarlemmer Pharmaceutsiche Fabriek, Haarlem, Netherlands
No Drawing. Filed Mar. 14, 1957, Ser. No. 645,882
4 Claims. (Cl. 167—65)

It is known that licorice (succus liquiritiae) is a medicine for stomach and intestinal ulcers. As a result of its content of glycyrrhizin (i.e. the potassium and calcium salts of glycyrrhizic acid) and of glycyrrhetenic acid (the aglucone of glycyrrhizic acid), however, which two compounds usually are present in licorice in an amount of 10 to 30%, licorice has very harmful side-effects in the above-mentioned therapy since these compounds give rise to troublesome or even dangerous oedema, vide N.T.v.G. 96, 2338 through 2341 (1952), and the publication by Molhuysen c.s. in The Lancet (September 9, 1950), pages 382–383.

The present invention provides a process for removing the above harmful principles from licorice (succus liquiritiae) by dissolving licorice in a dilution with water and heating, acidifying the solution thus obtained with sulfuric acid at elevated temperature to a pH value of about 3.0 to about 2.0, stirring the acidified solution, precipitating and removing the syrupy glycyrrhizic acid formed and the glycyrrhetenic acid, neutralizing the resulting liquid with ammonia and finally concentrating the product with subsequent pulverization, if desired.

This product is completely or substantially completely free from the above-mentioned harmful constituents and, on the other hand, has completely or substantially completely retained its valuable constituents. Moreover, the process can be carried out on an industrial scale without damaging the spasmolytic principle of the drug.

Consequently, this product constitutes a new composition of matter.

The process is elucidated by the following example:

100 kg. of licorice were mixed with 3 to 4 times their weight of water and the mixture was heated to a temperature of 40 to 52° C. The licorice dissolved to form a black-brown somewhat cloudy liquid. To this solution 4 N sulfuric acid was added slowly and with continuous stirring, while maintaining the indicated temperature range until the pH value of the solution amounted to about 2.5. After stirring for 15 minutes, the solution, from which the glycyrrhizic acid had been deposited as a syrupy mass, was decanted and centrifuged in a rapidly rotating centrifuge (e.g. a super centrifuge, r.p.m. about 16,000) in order to remove the finely divided glycyrrhetenic acid. The clear liquid flowing from the centrifuge was collected (first extract). The solid material obtained from the centrifuge and the glycyrrhizic acid which remained behind during decantation again were stirred for 15 minutes with at most 5 times their weight of water of 40 to 52° C., which water also had been acidified to the above pH value, after which time the temperature was maintained at 35–45° C. to recover as completely and quickly as possible the remaining valuable constituents. The mixture thus obtained was also centrifuged and the clear centrifugate obtained herewith was combined with the above-mentioned first extract. The combined extracts were neutralized with pure ammonia (10% $NH_3$), with litmus paper as an indicator.

The neutralized liquid was evaporated in a still at a low temperature and in vacuo to a thick liquid (specific gravity about 1.30) and thereupon transferred to flat enamelled discs and made in the usual manner into a dry extract in a vacuum drying cupboard and powdered, if desired.

After this treatment the dry licorice powder obtained contains at most 5% of water, at most 1% of glycyrrhizic acid and substantially no glycyrrhetenic acid, but for the rest all its original constituents. These two acids can be quantitatively determined beside each other by making use of their divergent solubilities in 40% alcohol because glycyrrhetenic acid is very poorly soluble therein.

The yield in dry deglycyrrhizinized licorice powder is dependent on the starting product but substantially amounts to the weight of the licorice diminished by the content of glycyrrhizin and glycyrrhetenic acid and the water content.

I prefer to mix the licorice with 3 to 4 times its weight of water as stated in the above example. Much lower amounts of water will give rise to solutions which are too thick for subsequent processing; nevertheless, the admissible lower limit of the water amount will be somewhat dependent on the quality of the starting material. The upper limit of the water amount is not critical, but undue dilution should be avoided for obvious reasons.

I also prefer to precipitate and remove the glycyrrhizic and glycyrrhetenic acids at a temperature of about 40° to 52° C., although it is to be understood that the present process is not limited thereto.

Substantially the same results were obtained when repeating the above-example with this difference only that the solution was acidified to a pH value of 2.9 and 2.1 respectively.

Although it is convenient to acidify with dilute sulfuric acid and to neutralize with dilute ammonia as shown by the example, this is not critical, much higher concentrations of these agents being applicable also, such as, for instance, 8 N sulfuric acid or even concentrated sulfuric acid when added dropwise and with vigorous stirring; the same is true for concentrated ammonia, for instance, 25% ammonia. I have actually checked all these modifications of the above example.

The licorice deglycyrrhizinized according to the method of the present invention can be processed to articles which are suitable for therapeutic dosing, such as tablets and the like. For certain purposes, it might be useful to incorporate thereinto also other medicines for stomach and/or intestinal diseases, such as bismuth preparations.

What I claim is:

1. A process for removing glycyrrhizin and glycyrrhetenic acid from licorice (succus liquiritiae), comprising the steps of diluting licorice in water and heating the diluted licorice to form an aqueous solution thereof, acidifying the solution with sulfuric acid at an elevated temperature to a pH value of about 3.0 to about 2.0, stirring the acidified solution, precipitating the syrupy glycyrrhizic acid formed and the glycyrrhetenic acid, removing the precipitate, neutralizing the resulting liquid from which the precipitate was removed with ammonia and concentrating the neutralized liquid.

2. The process of claim 1, wherein the solution is acidified with dilute sulfuric acid and the liquid is neutralized with dilute ammonia.

3. The process of claim 1, wherein the glycyrrhizic and glycyrrhetenic acids are precipitated and removed at a temperature of about 40° to about 52° C.

4. As a new composition of matter, licorice containing a spasmolytic principle, at most 1% of glycyrrhizin and substantially no glycyrrhetenic acid, said licorice being obtained by diluting licorice in water and heating the diluted licorice to form an aqueous solution thereof, acidifying the solution with sulfuric acid at an elevated temperature to a pH value of about 3 to about 2, stirring the acidified solution, precipitating the syrupy glycyrrhizic acid formed and the glycyrrhetenic acid, removing the precipitate, neutralizing the resultant liquid from which the precipitate was removed with ammonia and concentrating the neutralized liquid.

References Cited in the file of this patent

FOREIGN PATENTS

| | | |
|---|---|---|
| 240,035 | Germany | Oct. 27, 1911 |
| 937,246 | Germany | Dec. 29, 1955 |

OTHER REFERENCES

Mitchell: "Liquorice and Glycyrrhetinic Acid," Manufacturing Chemist, May 1956, pp. 169–172.

Desmarez: "Compt. Rend. Soc. Biol.," vol. 150, 1956, pp. 1022–23.

Vincent: "Therapie," vol. 7, 1952, pp. 338–341.